(12) United States Patent
Botha et al.

(10) Patent No.: US 9,592,494 B2
(45) Date of Patent: Mar. 14, 2017

(54) METHOD FOR THE PREPARATION OF A HYDROCARBON SYNTHESIS CATALYST MATERIAL AND THE USE THEREOF IN A HYDROCARBON SYNTHESIS PROCESS

(75) Inventors: Jan Mattheus Botha, Sasolburg (ZA); Alta Carina Ferreira, Vanderbijlpark (ZA); Jan Petrus Karel Reynhardt, Vanderbijlpark (ZA); Cathrin Alexandra Welker-Nieuwoudt, Vanderbijlpark (ZA)

(73) Assignee: Sasol Technology (PTY) Limited, Johannesburg (ZA)

(*) Notice: Subject to any disclaimer, the term of this patent is extended or adjusted under 35 U.S.C. 154(b) by 1393 days.

(21) Appl. No.: 13/140,240

(22) PCT Filed: Dec. 9, 2009

(86) PCT No.: PCT/IB2009/055600
§ 371 (c)(1),
(2), (4) Date: Dec. 6, 2011

(87) PCT Pub. No.: WO2010/070541
PCT Pub. Date: Jun. 24, 2010

(65) Prior Publication Data
US 2012/0083540 A1  Apr. 5, 2012

Related U.S. Application Data

(60) Provisional application No. 61/138,806, filed on Dec. 18, 2008.

(30) Foreign Application Priority Data

May 22, 2009 (ZA) ................... 2009/03549

(51) Int. Cl.
*B01J 21/00* (2006.01)
*B01J 23/00* (2006.01)
(Continued)

(52) U.S. Cl.
CPC ............. *B01J 23/745* (2013.01); *B01J 23/74* (2013.01); *B01J 23/76* (2013.01); *B01J 23/78* (2013.01);
(Continued)

(58) Field of Classification Search
USPC .......................................... 502/104, 100, 150
See application file for complete search history.

(56) References Cited

U.S. PATENT DOCUMENTS 4,207,305 A * 6/1980 Diamond ................ C01B 17/05
423/226
2004/0106517 A1 * 6/2004 Dlamini ................... B01J 23/80
502/326

(Continued)

FOREIGN PATENT DOCUMENTS

CN    1597105 A  *  3/2005
CN    1597105 A      3/2005
(Continued)

OTHER PUBLICATIONS

Baoshan Wu et al., Novel precipitated iron Fischer-Tropsch catalysts with $Fe_3O_4$ coexisting with $\alpha$-$Fe_2O_3$, *Catalysis Letters*, (Aug. 25, 2005) vol. 102, Nos. 3-4, pp. 211-218.

(Continued)

*Primary Examiner* — James McDonough
(74) *Attorney, Agent, or Firm* — Finnegan, Henderson, Farabow, Garrett & Dunner, LLP (57) ABSTRACT

This invention relates to a method for the preparation of a hydrocarbon synthesis catalyst material, in the form of a hydrocarbon synthesis catalyst precursor and/or catalyst, preferably, a Fischer Tropsch synthesis catalyst precursor and/or catalyst. The invention also extends to the use of a catalyst precursor and/or catalyst prepared by the method according to the invention in a hydrocarbon synthesis pro- (Continued)

cess, preferably, a Fischer Tropsch synthesis process. According to this invention, a method for the preparation of a hydrocarbon synthesis catalyst material includes the steps of treating Fe(II) carboxylate in solution with an oxidizing agent to convert it to Fe(III) carboxylate in solution under conditions which ensure that such oxidation does not take place simultaneously with any dissolution of Fe(0); and hydrolyzing the Fe(III) carboxylate solution resulting from step (iii) and precipitating one or more Fe(III) hydrolysis products.

17 Claims, 7 Drawing Sheets (51) Int. Cl.
*B01J 25/00* (2006.01)
*B01J 29/00* (2006.01)
*B01J 31/00* (2006.01)
*B01J 23/745* (2006.01)
*B01J 23/74* (2006.01)
*B01J 23/76* (2006.01)
*B01J 23/78* (2006.01)
*B01J 23/80* (2006.01)
*B01J 23/835* (2006.01)
*B01J 23/84* (2006.01)
*B01J 23/847* (2006.01)
*B01J 23/86* (2006.01)
*B01J 23/89* (2006.01)
*B01J 37/03* (2006.01)
*B01J 37/12* (2006.01)
*C10G 2/00* (2006.01)

(52) U.S. Cl.
CPC ............ *B01J 23/80* (2013.01); *B01J 23/835* (2013.01); *B01J 23/84* (2013.01); *B01J 23/8472* (2013.01); *B01J 23/862* (2013.01); *B01J 23/8906* (2013.01); *B01J 37/033* (2013.01); *B01J 37/12* (2013.01); *C10G 2/332* (2013.01); *C10G 2300/703* (2013.01)

(56) References Cited

U.S. PATENT DOCUMENTS

2004/0152791 A1* 8/2004 Zyl ..................... B01J 23/745
518/720
2005/0156136 A1* 7/2005 SenGupta ............... B01J 20/06
252/69
2007/0077164 A1* 4/2007 Hammond ............ B22F 3/1039
419/29

FOREIGN PATENT DOCUMENTS

RU          2269509 C2 *  2/2006
WO    WO 03/097236 A1    11/2003
WO    WO 2009/022261 A2   2/2009

OTHER PUBLICATIONS

International Search Report dated Nov. 29, 2010 issued in corresponding International Application No. PCT/IB2009/055600.

* cited by examiner

METHOD FOR THE PREPARATION OF A HYDROCARBON SYNTHESIS CATALYST MATERIAL AND THE USE THEREOF IN A HYDROCARBON SYNTHESIS PROCESS

FIELD OF THE INVENTION

This invention relates to a method for the preparation of a hydrocarbon synthesis catalyst material, in the form of a hydrocarbon synthesis catalyst precursor and/or catalyst, preferably, a Fischer Tropsch synthesis catalyst precursor and/or catalyst. The invention also extends to the use of a catalyst precursor and/or catalyst prepared by the method according to the invention in a hydrocarbon synthesis process, preferably, a Fischer Tropsch synthesis process.

BACKGROUND TO THE INVENTION

The Fischer Tropsch (FT) process, which can be described as a heterogeneous surface catalysed polymerisation reaction, usually entails the hydrogenation of carbon oxide (typically either carbon dioxide, carbon monoxide, or a mixture thereof) in the presence of a catalyst based on Group VIII metals, such as iron, cobalt and ruthenium. Depending on the particular reaction conditions, the products formed from this reaction may be water, gaseous, liquid and waxy hydrocarbons which may be saturated or unsaturated. Oxygenates of the hydrocarbons such as alcohols, acids, ketones and aldehydes can also be formed. The carbon number distribution of the products follows the well-known Anderson-Schulz-Flory distribution.

Where the carbon oxide comprises carbon monoxide, the reaction can be represented by the following equation:

$$nCO + 2nH_2 \rightarrow (CH_2)_n + nH_2O$$

Such heterogeneous Fischer Tropsch processes are usually referred to as being either a high temperature Fischer Tropsch (HTFT) process or a low temperature Fischer Tropsch (LTFT) process.

The HTFT process is usually carried out at temperatures from 250° C. to 400° C. and the catalyst employed is usually a fused iron-based catalyst, but precipitated iron-based catalysts can also be employed. At such temperatures, both the reactants and the products are in a gas phase in the reaction zone and, with the catalyst being in the solid form, the process can be referred to as a two phase FT-reaction. The process is usually commercially carried out in a fluidised bed reactor and the products obtained are of relatively high olefinicity and shorter chain length (that is, products in the gasoline and diesel range) compared to LTFT processes employing an iron catalyst.

The LTFT process is usually carried out at temperatures from 180° C. to 310° C. and the catalyst employed is usually a Co-based catalyst, although a Fe-based catalyst can also be used. The conditions under which this process is carried out, results in at least some of the products being in a liquid phase in the reactor. With the reactants being in the gas phase, at least some of the products in the liquid phase and the catalyst being solid, this process can be referred to as a three-phase process. The process is usually commercially carried out in a fixed bed reactor or a slurry bed reactor and the products obtained are heavier hydrocarbons such as waxes. A fluidised bed reactor cannot be used in this process, as the liquid product causes adhesion of the solid catalyst particles to each other, which will affect the fluidization properties of the catalyst.

Because the HTFT and LTFT processes are different, the catalyst used in each of the processes is accordingly usually also different. The catalyst is generally optimised for a specific process and for the attainment of a specific range of products.

It is usually commercially desirous to be able to produce iron based catalysts for both the LTFT and HTFT reactions from a substantially pure source of iron oxide.

The preparation of such iron oxides is well known in the art, and some of such methods date back to those described in U.S. Pat. Nos. 1,327,061 and 1,368,748 according to which metallic iron is immersed in a solution of a soluble ferrous or ferric salt into which an oxidising agent such as air is introduced to precipitate the desired ferric salt.

A disadvantage associated with the aforesaid known processes described in said two US patents is that the metal dissolution, oxidation and hydrolysis all take place in the same vessel and at the same time. Dissolution rates, oxidation rates and hydrolysis rates are therefore difficult to control individually and can accordingly give rise to undesired forms of iron being formed.

Another prior known process, disclosed in U.S. Pat. No. 6,790,274, entails the dissolution of Fe(0) in an acidic medium in which the acid to iron ratio is less than 3:1, oxidation of the resultant Fe(II) to Fe(III), and the hydrolysis, and consequential precipitation of the Fe(III), all done in the same vessel.

It is accordingly extremely difficult in this process to do rapid oxidation of all of the iron as well as rapid precipitation of the formed Fe(III) since the rate determining step is the dissolution of Fe(0) through the in situ redox couple of Fe(0)+2Fe(III)→3Fe(II) whereby some of the formed Fe(III) is reduced to Fe(II) again. A disadvantage associated with this is that additional oxidising agent is required to convert the Fe(II) so formed back to Fe(III). As a result, some of the oxidising agent is accordingly indirectly used to oxidise Fe(0) to Fe(II).

A further disadvantage found with the aforesaid process of U.S. Pat. No. 6,790,274 is that it keeps on generating Fe(II) in solution which slows down the net rate of formation of Fe(III) in solution. A yet further disadvantage is that due to the aforesaid redox couple it is extremely difficult to perform hydrolysis and/or precipitation of exclusively Fe(III) from the solution.

Methods for the production of iron based Fischer Tropsch catalysts are also known in the art. In one such method, disclosed in U.S. Pat. No. 7,199,077, the process comprises the steps of preparing an aqueous solution of carboxylic acid and water and adding iron metal thereto, thereafter forcing an oxidising agent through the acidic solution to consume the iron and to form an iron oxide slurry. The slurry is then milled and promoters added thereto. The product is then spray dried and calcined to form the catalyst.

Because the dissolution, oxidation and hydrolysis of the metal in this process is carried out at the same time and in the same vessel, incomplete dissolution of the iron metal in the acidic solution prior to oxidation can occur. This means that promoters that can be involved in a redox couple with Fe(0) (for instance copper) may only be introduced to the process after the iron slurry is removed from the reaction vessel, because the promoters could otherwise interfere with the dissolution of the iron.

The Applicant has now found a method of producing an iron-based catalyst precursor and/or catalyst that reduces and/or eliminates at least some of the aforesaid disadvantages. Furthermore, it has also been found that such a catalyst, on activation, can successfully be used in a FT-process, particularly a LTFT process for the synthesis of hydrocarbons from syngas.

OBJECT OF THE INVENTION

It is an object of the invention to provide a novel method for the preparation of a hydrocarbon synthesis catalyst material in the form of a hydrocarbon synthesis catalyst precursor and/or catalyst.

It is a further object of the invention to provide a method for the preparation of a hydrocarbon synthesis catalyst precursor and/or catalyst that overcomes or at least minimises the aforesaid disadvantages.

A yet further object of the invention involves the utilization of such a hydrocarbon synthesis catalyst in a Fischer Tropsch process.

SUMMARY OF THE INVENTION

According to the invention, a method for the preparation of a hydrocarbon synthesis catalyst material includes the steps of:
(i) providing Fe(II) carboxylate in solution;
(ii) if the molar ratio of carboxyl and carboxylate groups, which groups have either reacted with iron or are free to do so, to Fe(II) in the solution of step (i) is not at least 3:1, adding a source of a carboxyl or a carboxylate group to the solution to ensure that said molar ratio is at least 3:1 prior to the completion of the oxidation of the Fe(II) carboxylate referred to in step (iii) below;
(iii) treating the Fe(II) carboxylate in solution with an oxidising agent to convert it to Fe(III) carboxylate in solution under conditions which ensure that such oxidation does not take place simultaneously with any dissolution of Fe(0);
(iv) hydrolysing the Fe(III) carboxylate solution resulting from step (iii) and precipitating one or more Fe(III) hydrolysis products;
(v) recovering the one or more hydrolysis products of step (iv); and
(vi) adding one or more promoters, or sources of promoter, during or subsequent to any of the preceding steps in order to produce a catalyst material in the form of a hydrocarbon synthesis catalyst precursor.

It will be appreciated that such catalyst precursor will be suitable for use in hydrocarbon synthesis only once it has been activated.

The method may also include a step of activating the catalyst precursor by reducing the said catalyst precursor, thereby producing a catalyst material in the form of a hydrocarbon synthesis catalyst.

The catalyst precursor may be a Fischer Tropsch synthesis catalyst precursor. The catalyst may be a Fischer Tropsch synthesis catalyst. The Fischer Tropsch synthesis may be two-phase Fischer Tropsch synthesis, alternatively it may be three-phase Fischer Tropsch synthesis. The three-phase Fischer Tropsch synthesis may be carried out in a fixed bed reactor, but preferably it is carried out in a slurry bed reactor.

Preferably the Fe(II) carboxylate solution of step (i) is prepared in a prior step comprising the dissolution of iron, having an oxidation state of zero, in an acidic solution including at least one carboxylic acid.

Such prior step will be referred to herein below as the dissolution step.

It will be appreciated that an Fe(II) carboxylate solution so prepared will often include undissolved Fe(0). In such a case, the undissolved Fe(0) will have to be removed, as provided for elsewhere in the specification.

The Fe(II) carboxylate in solution may include $Fe^{2+}$ ions, one or more carboxylate groups, Fe(II) carboxylate and optionally one or more carboxyl groups.

In an embodiment thereof, the present invention provides for the source of a carboxyl group or a carboxylate group to be a carboxlic acid.

Preferably the product referred to in step (vi) is in the form of a slurry or a paste, a slurry being a free-flowing, pumpable suspension of fine solid material in liquid and a paste having a soft and malleable consistency.

In one embodiment of the invention, step (i) may be performed in a first vessel, while at least step (iii) may take place in a separate vessel.

Step (i)

The first step of the process entails providing Fe(II) carboxylate in solution. This solution may be formed by means of a dissolution step wherein a source of iron, Fe(0), is dissolved in a suitable solution, preferably an acidic solution, preferably an aqueous solution including one or more carboxylic acids, in order to convert iron in the zero oxidation state to Fe(II) carboxylate in solution where the iron is in an oxidation state of two.

The source of iron may be metallic iron. The source of iron may be selected from the group consisting of iron filings, iron turnings, scrap iron metal, atomised iron, powdered iron and iron chips. The source of iron is preferably one in which the iron does not include any substantial amounts of impurities such as Si, Al and Mn.

In an embodiment of the invention, where the source of iron may be particulate in nature, the particles may have an average particle diameter of less than 250 microns, preferably between 30 and 200 microns. Where the source of iron may be in the form of iron scraps, iron turnings or iron chips, the surface area thereof is preferably greater than 0.01 $m^2$ per kg of iron.

The carboxylic acid employed in the dissolution step (or in subsequent steps set out below) is preferably a short-chained carboxylic acid, preferably with not more than three carbon atoms. The carboxylic acid may include only one carboxyl group, alternatively it may contain more than one carboxyl group. The carboxylic acid may be selected from the group consisting of oxalic acid, formic acid, acetic acid, glycolic acid, pyruvic acid, malonic acid and propionic acid. In a preferred form of the invention the carboxylic acid may be formic acid, acetic acid, propionic acid or oxalic acid and, even more preferably, it is acetic acid.

In an embodiment of the invention, the carboxylic acid employed in said dissolution step may comprise an aqueous solution thereof. Preferably, the molar ratio of water to carboxylic acid in step (i) may be 1:25 to 25:1, preferably 1:25 to 10:1 and more preferably 1:25 to 1:1.

The pH of the Fe(II) carboxylate in solution provided in step (i) may be below 7, and is preferably between 2 and 5.

The dissolution of the iron may be carried out at a temperature in the range from 20° C. to 200° C., preferably 40° C. to 120° C. and more preferably from 50° C. to 110° C., and may take place at ambient pressure. Preferably it is carried out at ambient pressure under an inert atmosphere. Preferably the inert atmosphere is an atmosphere of nitrogen.

Such dissolution may be allowed to take place until at least 90% of the iron is converted to Fe(II) carboxylate in solution, preferably at least 95% and, more preferably, at least more than 99%.

Further according to the invention, the molar ratio of the total carboxyl and carboxylate groups (which groups have either reacted with iron or are free to do so) of the carboxylic acid to the iron in the dissolution step may be at least 2:1 in order to ensure that substantially all of the iron component of the source of iron is converted to Fe(II) carboxylate in solution.

Step (ii)

The second step of the process according to the invention is important since it is believed that the stated molar ratio serves to prevent the premature hydrolysis, and consequential precipitation, of the iron in solution.

It will be appreciated that subsequent to the formation of Fe(II) carboxylate in the dissolution step, but preferably prior to the oxidation of Fe(II) in step (iii), more of a source of a carboxyl or a carboxylate group may be added to the acidic solution in order to achieve the aforesaid molar ratio of at least 3:1.

Preferably, carboxylic acid is added in step (ii) to achieve the said molar ratio of at least 3:1.

It will be appreciated further that the addition of carboxylic acid may also serve to ensure that all the Fe(II) carboxylate in solution is oxidised to Fe(III) carboxylate in step (iii).

Alternatively the acidic solution may ab initio include an excess of carboxylic acid in order to ensure that said molar ratio is reached.

Step (iii)

Step (iii) of the process entails the addition of an oxidising agent to the Fe(II) carboxylate in solution in order to oxidise it to Fe(III) carboxylate in solution in a manner which ensures that such oxidation does not take place simultaneously with any dissolution of any Fe(0).

To achieve this, the overall process may be carried out in separate stages, preferably employing at least two separate vessels, of which at least one vessel is for step (iii), and which vessel contains no Fe(0).

Alternatively, the same result may be achieved by ensuring that all the Fe(0) is converted to Fe(II) in step (i) or that any undissovled Fe(0) is removed from the reaction medium before step (iii) is carried out.

Such undissolved Fe(0) may be removed by one or more of the following techniques: filtration, decantation, or magnetic separation. In a preferred embodiment of the invention, such undissolved Fe(0) may be removed by means of filtration.

The oxidising agent in step (iii) may be selected from the group consisting of one or more of oxygen, hydrogen peroxide, ozone, an organic peroxide, a hydroperoxide, and a gaseous mixture containing oxygen, such as, air, for example.

The oxidising agent may be added to the Fe(II) carboxylate in solution at room temperature, alternatively at a temperature between 50° C. to 100° C., preferably at a temperature not exceeding 70° C.

In an embodiment of the invention, the molar ratio of oxidising agent to Fe(II) carboxylate in step (iii) may be 2:1 more preferably 1:1 to ensure that substantially all of the Fe(II) carboxylate is oxidised to Fe(III) carboxylate.

In a preferred embodiment of the invention, at least 90%, preferably 95% and most preferably 99% of the Fe(II) carboxylate is converted to Fe(III) carboxylate prior to the hydrolysis in step (iv).

Step (iv)

This step involves the hydrolysis of the Fe(III) carboxylate in solution resulting from step (iii) with water under conditions which are known in the art to yield a precipitated iron oxide or an iron hydroxide hydrolysis product.

The hydrolysis products of step (iv) may be formed either by precipitation with a base or by means of thermal hydrolysis (thermal decomposition).

In one embodiment of the invention, the hydrolysis products of step (iv) may be precipitated from the Fe(III) carboxylate in solution with a base. The base may be any suitable base and may be selected from the group consisting of sodium carbonate, sodium hydroxide, potassium carbonate and potassium hydroxide.

Preferably, the base is potassium carbonate or sodium carbonate.

The above precipitation reaction, which entails a reaction between the Fe(III) carboxylate (produced in step (iii)) and the base in the presence of water, may be represented by the following equation:

$$Fe(III)carboxylate + base + H_2O \rightarrow Fe(OH)_3 + carboxylate\ salt$$

The carboxylate salt that is produced may then be reacted with an acid, such as HCl, to yield the corresponding carboxylic acid. Depending on the particular carboxylic acid employed in the process, examples of the carboxylate salt may include sodium formate, sodium acetate, sodium propionate, disodium oxalate, potassium formate, potassium acetate and dipotassium oxalate.

Alternatively, the above precipitation reaction may be carried out using ammonia or ammonium hydroxide as a base. In this case ammonium acetate would be formed as a by-product which could be decomposed to yield ammonia and acetic acid for possible use elsewhere.

In yet another embodiment of the invention, the hydrolysis products may be formed by thermal hydrolysis to yield a precipitate which may be in the form of an iron oxide, iron oxy-hydroxides, iron hydroxides, or a combination thereof, together with a carboxylic acid effluent. The carboxylic acid effluent may be recycled or used elsewhere.

It will be appreciated that various forms of iron oxide, iron oxy-hydroxide and iron hydroxide may be so obtained. Non-limiting examples of these include hematite, maghemite, Fe(OH)$_3$, goethite, ferroxyhyte, lepidrocrocite and akaganeite.

In an embodiment of the invention, the water to Fe(III) carboxylate molar ratio in the hydrolysis of step (iv) may be between 6:1 and 1:3, preferably between 3:1 and 1:1.

Step (v)

In step (v), the hydrolysis product formed during step (iv) is recovered by separating the hydrolysis products from the solution from which they have been precipitated. The separation may be by means of filtration or other suitable methods such as centrifugation.

This step may also include the removal of any hydrolysis by-products by means of techniques known in the art, such as washing or the like.

It will further be appreciated that the removal of the by-products may take place simultaneously with the recovery of the hydrolysis product.

If filtration is used to achieve separation of the hydrolysis products from the solution, a filter cake may be formed.

In a further embodiment of the invention, the recovered hydrolysis product described above may be subjected to drying and/or shaping techniques. In a preferred embodiment of the invention, the hydrolysis product is subjected to spray drying. Alternatively, the recovered hydrolysis product may be extruded, preferably after drying.

The recovered hydrolysis product may also be calcined, preferably to oxidise the hydrolysis product. Preferably, calcination is performed subsequent to drying.

Step (vi)

This step entails the addition of one or more promoters, or sources of promoter, to the solution during or subsequent to any one of steps (i) to (v).

The one or more promoters, or sources of promoter, added in step (vi), may be a promoter or a source of promoter that lends itself to intimate contact with the iron in the catalyst material. Such a promoter or source of promoter may be a chemical promoter or a source of a chemical and/or a structural promoter or a source of a structural promoter.

Such promoter or source of promoter may be one which assists in the reduction of the iron in the catalyst precursor.

In such a case, the source of promoter may be a soluble salt of a transition metal, and such soluble salt may be selected from the group consisting of lead, copper, tin, cobalt, nickel, chromium, vanadium, cadmium, zinc, aluminium, manganese, gold, platinum, silver and a mixture of two or more thereof. Preferably, the source of promoter is a soluble salt of copper, tin, cobalt, nickel, chromium, cadmium or zinc. Most preferably, the source of promoter is a soluble salt of copper.

Although the source of promoter may be introduced at any stage of the process after the complete dissolution of the Fe(0), or after the removal of the Fe(0), in a preferred embodiment of the invention, the source of promoter may be introduced prior to the hydrolysis in step (iv).

The source of promoter may be added such that the elemental molar ratio of Fe to promoter may be between 250:1 and 10:1, preferably, between 100:1 and 15:1, and more preferably between 40:1 and 20:1.

In a preferred embodiment of the invention, the source of promoter may be introduced to the solution either before, during, or after the oxidation in step (iii) of the Fe(II) carboxylate in solution, provided that there is no Fe(0) present in such solution.

Preferably such addition takes places immediately before or during the said oxidation.

Most preferably, the addition of the source of promoter takes place immediately prior to such oxidation.

The applicant believes that the addition of certain sources of promoter (such as a copper salt) either immediately before or during such oxidation is important because it is believed to aid the oxidation.

In this embodiment of the invention, the oxidising agent may be added to the solution of Fe(II) carboxylate and source of promoter at a temperature between 50° C. to 100° C., preferably at a temperature not exceeding 70° C.

The Applicant believes that the possibility of being able to add the source of promoter at any stage in the process after the complete dissolution of the Fe(0), or after the removal of the Fe(0), and not only after the recovery of the hydrolysis product, as is the case with the prior art, to be an important and distinctive aspect of the present invention.

The invention also offers substantial other advantages over previous processes according to which the whole process is conducted in the same vessel and which results in incomplete dissolution of Fe(0), and with the dissolution of which the promoter may interfere.

In contrast, in the present invention, where the various steps can be conducted as individual and distinct steps in the manner set out above, complete dissolution of Fe(0) in the acidic solution may be achieved or the Fe(0) is removed. Accordingly, there is no Fe(0) present with which the promoters can interfere. The source of promoter can accordingly also be introduced prior to hydrolysis of the Fe(III) carboxylate.

A chemical promoter may be added. The source of the chemical promoter may be a soluble salt of an alkali metal or an alkaline earth metal. These promoters usually influence the activity and/or selectivity of the catalyst formed. Preferably, the source of chemical promoter is a soluble salt of magnesium, sodium, potassium, barium, strontium, calcium, beryllium or lithium. Such a source of chemical promoter is preferably added to the one or more recovered hydrolysis products.

The source of chemical promoter may be added such that the elemental molar ratio of Fe to chemical promoter is between 170:1 and 5:1. Preferably, the molar ratio of Fe to chemical promoter is between 30:1 and 10:1.

A structural promoter, preferably in the form of a refractory oxide, such as $SiO_2$, may also be added. The source of the structural promoter may be a waterglass, and preferably it is potassium waterglass. This structural promoter may be added to the one or more recovered hydrolysis products.

There is further provided for the structural promoter to be added in such an amount that the molar ratio of Fe to structural promoter is between 10:1 and 0.75:1. Preferably, the molar ratio of Fe to structural promoter is between 2.5:1 and 1.5:1.

In a preferred embodiment of the invention, the chemical and/or structural promoter added to the one or more recovered hydrolysis products may be added to a filter cake formed during step (v).

Activation of Catalyst Precursor

The hydrocarbon synthesis catalyst precursor formed in step (vi) may be activated by means of reduction. In an embodiment of the invention the catalyst precursor may be subjected to a reduction step so as to reduce the iron in the catalyst precursor to iron having an oxidation state of zero (e.g. iron metal and iron carbides).

The reduction step may be carried out in the presence of a reducing gas. In an embodiment of the invention, the reducing gas may be at a pressure of 10 to 25 bar. The reducing gas may be hydrogen and/or carbon monoxide.

In an embodiment of the invention, the reduction step may be carried out at a temperature of 200° C. to 270° C., preferably 250° C. The reduction step may be carried out for 3 to 24 hours, preferably 16 hours.

Preferably at least 40% (based on mass iron/mass of total iron), preferably at least 60% and more preferably at least 80%, of the iron compound of the catalyst is reduced to be in an oxidation state of zero. Preferably, substantially all iron is reduced to an oxidation state of zero.

According to another aspect of the invention, there is provided a hydrocarbon synthesis catalyst precursor and/or catalyst prepared according to the method set out herein.

According to yet another aspect of the invention, there is provided the use of an activated hydrocarbon synthesis catalyst precursor, prepared according to the method set out herein, in a Fischer Tropsch synthesis reaction. The synthesis reaction may be a two-phase Fischer Tropsch reaction, but preferably it is a three-phase Fischer Tropsch synthesis reaction. The three-phase Fischer Tropsch synthesis reaction may be carried out in a fixed bed reactor, but preferably it is carried out in a slurry bed reactor.

According to another aspect of the invention, there is provided a hydrocarbon synthesis process comprising preparing a hydrocarbon synthesis catalyst according to the method set out above and contacting hydrogen with carbon monoxide at a temperature above 100° C. and at a pressure of at least 10 bar in the presence of the hydrocarbon synthesis catalyst thereby producing hydrocarbons and, optionally, oxygenates of hydrocarbons.

The hydrocarbon synthesis process may be a Fischer Tropsch synthesis process. The Fischer Tropsch synthesis process may be a two-phase Fischer Tropsch process, but preferably it is a three-phase Fischer Tropsch synthesis process. The three-phase Fischer Tropsch synthesis process may be carried out in a fixed bed reactor, but preferably it is carried out in a slurry bed reactor.

The temperature at which the Fischer Tropsch synthesis process is carried out may be from 180° C. to 250° C., preferably from 200° C. to 230° C. The pressure at which the Fischer Tropsch synthesis process is carried out may be from 10 to 40 bar, i.e. 1000 to 4000 kPa.

The process may include subjecting the hydrocarbons and, if present, the oxygenates of hydrocarbons, to hydroprocessing, thereby converting them to liquid fuels and/or to chemicals.

Effluent Recycle

The present method may include the further step of recovering and recycling effluent, in the form of carboxylic acid, produced as a result of the hydrolysis, and consequential precipitation with a base, or thermal decomposition, of the Fe(III) carboxylate in solution in step (iv) which effluent may be used in either of steps (i) and/or (ii) of the process.

In one embodiment of the invention, between 60% to 99%, and preferably at least 75% of the carboxylic acid effluent, expressed as a percentage of the initial carboxylic acid used in steps (i) and (ii), is so recovered.

The carboxylic acid effluent recovered in this step may be returned to the process for the dissolution of Fe(0) to form Fe(II) for step (i) or in step (ii) for attaining the said desired molar ratio.

This invention will now be further described by means of the following non-limiting examples.

EXAMPLES

Example 1

Catalyst Precursor Preparation by Precipitation

The following procedure was followed in forming a chemically promoted iron catalyst precursor wherein the hydrolysis product is formed by means of precipitation with a base:

Iron (30 g, 0.5372 mole) was dissolved under a constant flow of nitrogen in a mixture of water (65 ml) and acetic acid (65 ml, 1.048 mole) at 70° C. to form Fe(II) acetate in solution whereby the iron:acetic acid mole ratio was 1:2. After all the iron was dissolved, the solution was filtered and then cooled to room temperature and 7.75 g of a promoter comprising copper(II) acetate monohydrate (0.03882 mole) and 140 ml of a solution of acetic acid (1.223 mole) and water (1:1 volume ratio) was added such that the final iron:acetic acid mole ratio was 1:4. After this, hydrogen peroxide (30 w/w % in water) (60 ml) was slowly added to the solution to oxidise the Fe(II) acetate to Fe(III) acetate. The solution was stirred for three hours at room temperature. During such oxidation, the solution changed from milky white to a deep red colour. After the oxidation was completed, the solution turned a deep purple colour (UV Vis was used to confirm that oxidation thereof was complete) and the solution was slowly added to a boiling solution of sodium carbonate (200 g in 400 ml water heated to boiling point), which caused iron/copper oxide to precipitate together with the formation of sodium acetate in solution. The heat was removed and the reaction mixture was stirred for an additional hour. The slurry so formed was filtered and washed to remove the sodium acetate. The precipitate was re-slurried in 200 ml of distilled water and 34 g of potassium waterglass was added.

Example 2

Catalyst Preparation and the Use Thereof in FT Synthesis

Figure 1:
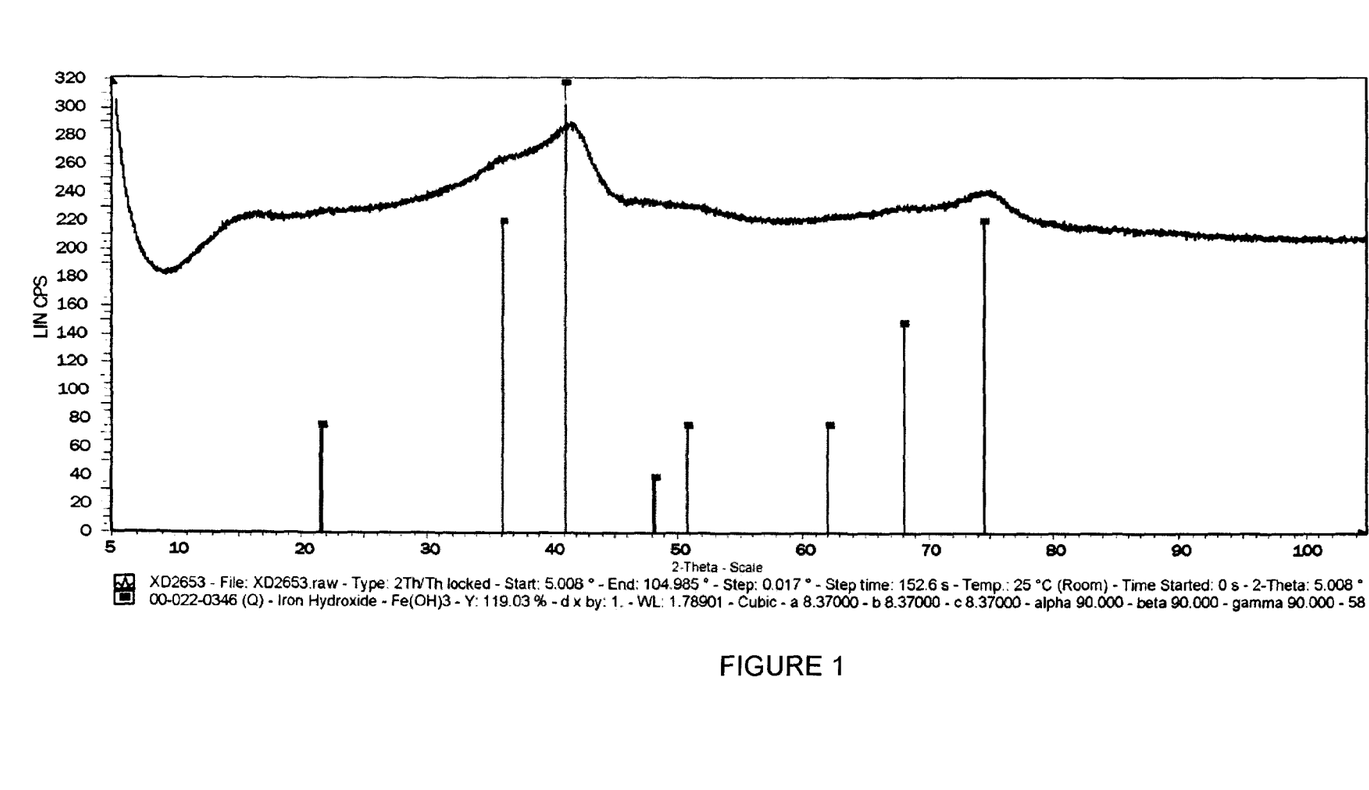
FIG. 1: is an X-Ray Diffraction (XRD) pattern for a chemically promoted iron catalyst precursor prepared in accordance with the invention as set out in Example 1.

The following procedure was followed in forming a chemically promoted iron catalyst:

The precipitate formed in Example 1 was dried at 150° C. and subsequently calcined at 450° C. The XRD graph of the resultant catalyst precursor is shown in FIG. 1, from which it can be seen the catalyst precursor is in the $Fe(OH)_3$ phase, being in an oxidation state of III. The catalyst precursor was sieved between 36 and 150 µM before it was evaluated under Fischer Tropsch synthesis conditions as follows:

300-350 g of a Fischer Tropsch wax was loaded into a 1 l CSTR (Continuous-Stirred Tank Reactor) and melted at 160° C. After the wax was completely melted, 10 g of the above catalyst precursor was added. The reactor was closed, the temperature set at 255° C. and the stirrer switched on. The pressure of the system was increased slowly with Argon until a pressure of 14.5 bar was achieved. After the temperature and pressure stabilised at 255° C., $H_2$ and CO was introduced while the Argon was decreased until a $H_2$/CO ratio of 1.55 and a gas hourly space velocity (GHSV) of 10500 $ml_n$/g cat/h was achieved. The catalyst precursor was activated under these conditions for 16 hours. After activation, the temperature was decreased to 245° C. and the pressure was increased to 26.5 bar. The catalyst yielded a syngas conversion of 30% (at a GHSV of 10500 ml$_n$/g cat/h) and a methane selectivity of 2%.

The results obtained are reflected in Table I set out below.

Example 3

Recycling of by-Products

In order to minimise production costs of the process according to the invention, sodium acetate, produced as a result of hydrolysis in Example 1, may be recycled by reaction with an acid. The recycle step is based on the lower solubility of NaCl compared to NaOAc (at 25° C.: NaCl solubility: 26.5 g/100 g H$_2$O; NaOAc solubility: 76.5 g/100 g H$_2$O).

Figure 2:
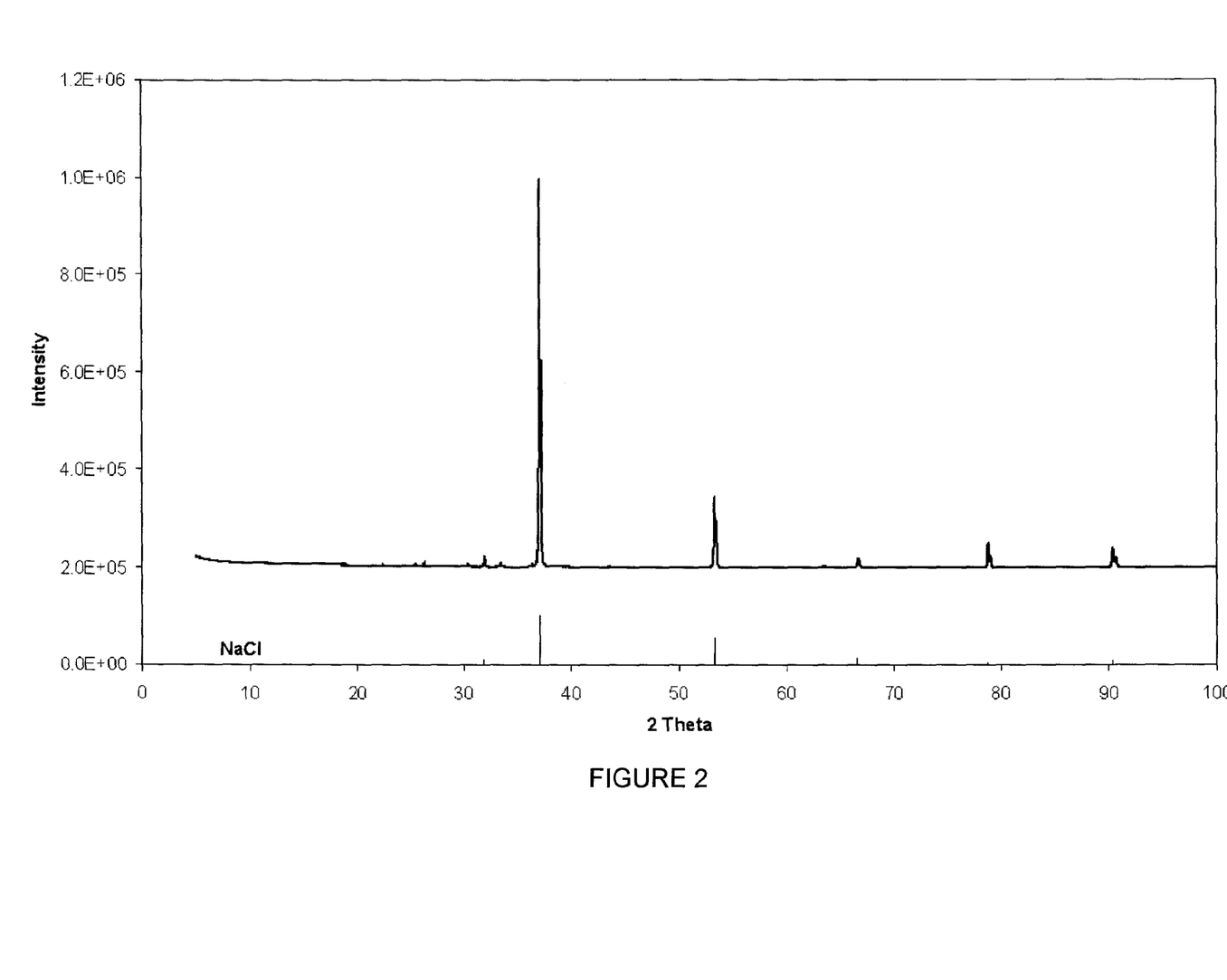
FIG. 2: is an XRD pattern for sodium chloride produced during the recycle of acetic acid in accordance with the invention as set out in Example 3.

A saturated solution of sodium acetate (18 g) was prepared by dissolving it in 50 ml boiling water. After all the sodium acetate was dissolved, 50 ml of 32 vol % HCl was added and the solution was heated to boiling point in order to cause the evaporation of the water with some of the acetic acid so that a white sodium chloride residue was formed. This residue was filtered and the remaining acetic acid was recovered as a filtrate. This filtrate was added to the recovered evaporated water/acetic acid solution. The precipitate was dried in an oven at 150° C. for 30 minutes and submitted for XRD analysis (as depicted in FIG. 2). The analysis of the solution applying GC/MS and HPLC revealed the presence of concentrated acetic acid.

Example 4

Catalyst Precursor Preparation by Thermal Decomposition

The same procedure as in Example 1 was followed, up to the point where Fe(II) acetate is completely oxidized to Fe(III) acetate:

After Fe(II) acetate was completely oxidized to Fe(III) acetate, the solution was pumped into a 1-liter Parr Autoclave (pre-heated to 250° C.) via a HPLC pump while stirring at a constant speed of 120 rpm. The iron(III) acetate solution was continuously pumped into the reactor at a flow rate of 10 ml/min. The reactor pressure increased to ca. 38 bar as a result of steam formation in the reactor at this high temperature. The reactor conditions were maintained at 250° C. and 120 rpm. The product (namely the iron slurry) was withdrawn from the reactor in 2 minute intervals. The slurry was filtered and washed to remove the acetic acid. The precipitate was re-slurried in 200 ml of distilled water and 34 g of potassium waterglass was added.

Example 5

Catalyst Preparation and the Use Thereof in FT Synthesis

Figure 3:
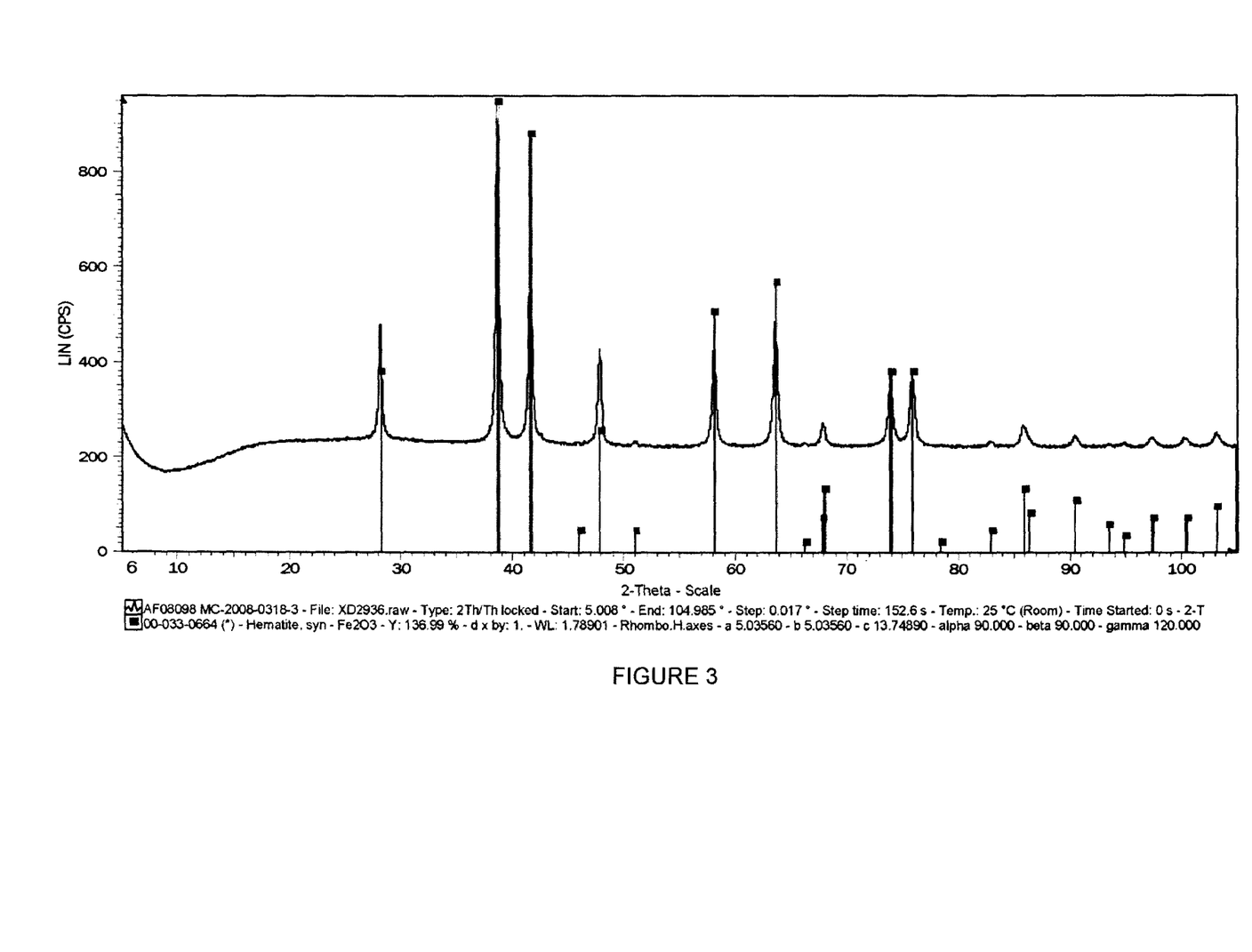
FIG. 3: is an XRD pattern for a chemically promoted iron catalyst precursor prepared in accordance with the invention as set out in Example 4.

The following procedure was followed in forming a chemically promoted iron catalyst:

The precipitate formed in Example 4 was dried at 150° C. and subsequently calcined at 450° C. The XRD graph of the resultant catalyst precursor is shown in FIG. 3, from which it is evident that the resulting iron catalyst precursor is in the hematite phase. In this phase, iron has an oxidation state of III. The catalyst precursor was sieved between 36 and 150 µm before it was evaluated under Fischer Tropsch Synthesis conditions as follows:

300-350 g of Fischer Tropsch wax was loaded into a 1 l CSTR and melted at 160° C. After the wax was completely melted, 10 g of the above catalyst precursor was added. The reactor was closed and the temperature was set at 255° C. and the stirrer switched on. The pressure of the system was increased slowly with Argon until a pressure of 14.5 bar was achieved. After the temperature and pressure stabilised at 255° C., H$_2$ and CO was introduced while the Argon was decreased until a H$_2$/CO ratio of 1.55 and a gas hourly space velocity (GHSV) of 10500 ml$_n$/g cat/h was achieved. The catalyst precursor was activated under these conditions for 16 hours. After activation, the temperature was decreased to 245° C. and the pressure increased to 26.5 bar. The catalyst yielded a syngas conversion of 4.5% (at a GHSV of 6385 ml$_n$/g cat/h) and a methane selectivity of 7.1%.

The results obtained are reflected in Table I set out below.

Example 6

Recycling of Some of the Reactant Products Produced Via Thermal Decomposition The acetic acid that is produced as a result of hydrolysis in Example 4 may be returned to the dissolution step of the process, for the dissolution of Fe(0) to form Fe(II), or may be returned to step (ii) in order to attain the said desired molar ratio.

Example 7

Catalyst Precursor Preparation by Air Oxidation

The following procedure was followed in forming a chemically promoted iron catalyst precursor wherein oxidation of Fe(II) acetate to Fe(III) acetate is achieved by employing air as the oxidizing agent:

Iron (30 g, 0.5372 mole) was dissolved under a constant flow of nitrogen in a mixture of water (65 ml) and acetic acid (65 ml, 1.048 mole) at 70° C. to form Fe(II) acetate in solution, whereby the iron:acetic acid mole ratio was 1:2. After all the iron was dissolved, the solution was filtered and then cooled to room temperature and 7.75 g of a promoter comprising copper(II) acetate monohydrate (0.03882 mole) and 140 ml of a solution of acetic acid (1.223 mole) and water (1:1 volume ratio) was added such that the final iron:acetic acid mole ratio was 1:4. Air was bubbled for 6 hours at 70° C. through the solution until oxidation was completed, as evidenced when the solution turned a deep purple colour. UV-Vis was employed to confirm that the oxidation thereof was complete. The solution was added to boiling sodium carbonate (200 g in 600 ml of water). The solution was filtered and the resulting precipitate washed until the conductivity gave less than 500 µs. Potassium waterglass (PWG) (32 g) was added and stirred for 30 minutes at room temperature.

Example 8

Catalyst Preparation and the Use Thereof in FT Synthesis

Figure 4:
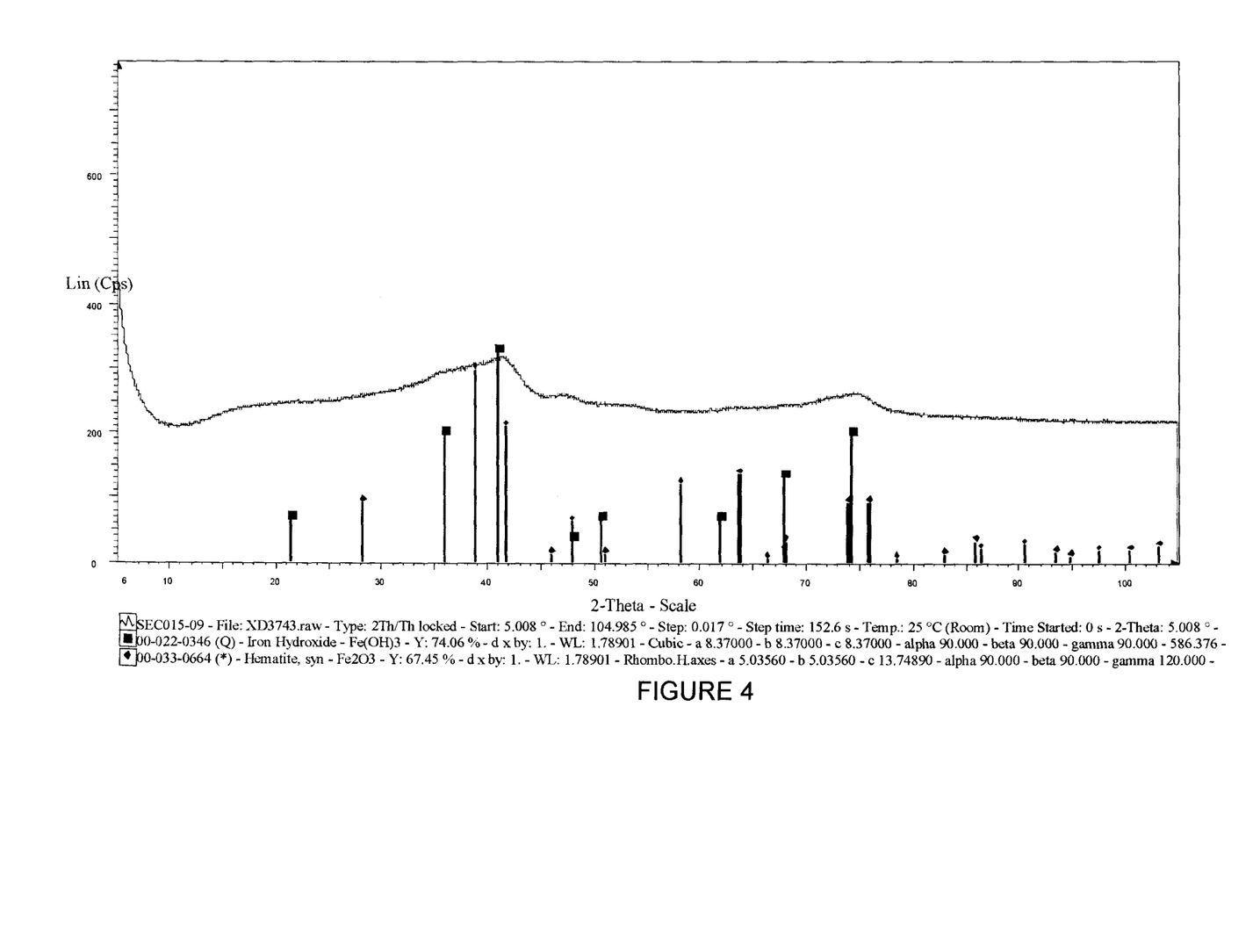
FIG. 4: is an XRD pattern for a chemically promoted iron catalyst precursor prepared in accordance with the invention as set out in Example 7.

The following procedure was followed in forming a chemically promoted iron catalyst:

The precipitate formed in Example 7 was dried at 150° C. and subsequently calcined at 450° C. The XRD graph of the resultant catalyst precursor is shown in FIG. 4, from which it is evident that the resulting iron catalyst precursor is a mixture of phases i.e. Hematite and Fe(OH)$_3$. In these phases, iron has an oxidation state of Ill. The catalyst precursor was sieved between 36 and 150 μm before it was evaluated under Fischer Tropsch synthesis conditions as follows:

300-350 g of Fischer Tropsch wax was loaded into a 1 l CSTR and melted at 160° C. After the wax was completely melted, 10 g of the catalyst precursor was added. The reactor was closed and the temperature was set at 255° C. and the stirrer switched on. The pressure of the system was increased slowly with Argon until a pressure of 14.5 bar was achieved. After the temperature and pressure stabilised at 255° C., H$_2$ and CO was introduced while the Argon was decreased until a H$_2$/CO ratio of 1.55 and a gas hourly space velocity (GHSV) of 10500 ml$_n$/g cat/h was achieved. The catalyst precursor was activated under these conditions for 16 hours. The catalyst yielded a syngas conversion of 21% (at a GHSV of 9018 ml$_n$/g cat/h) and a methane selectivity of 5.6%.

The results obtained are reflected in Table I set out below.

Example 9

Catalyst Precursor Preparation

The following procedure was followed in forming a chemically promoted iron catalyst precursor wherein the copper promoter is added after impregnation with silica and potassium:

Iron (30 g, 0.5372 mole) was dissolved under a constant flow of nitrogen in a mixture of water (65 ml) and acetic acid (65 ml, 1.048 mole) at 70° C. to form Fe(II) acetate in solution, whereby the iron:acetic acid mole ratio was 1:2. After all the iron was dissolved, the solution was filtered and then cooled to room temperature and 140 ml of a solution of acetic acid (1.223 mole) and water (1:1 volume ratio) was added such that the final iron:acetic acid mole ratio was 1:4. Hydrogen peroxide (30 w/w % in water) (60 ml) was slowly added to the solution to oxidise the Fe(II) acetate to Fe(III) acetate.

The solution was stirred for 2 minutes in a 1 l flask and was thereafter stirred for three hours. The solution turned a deep purple colour indicating that the oxidation of Fe(II) acetate to Fe(III) acetate was complete. (UV-Vis was employed to confirm that the oxidation thereof had indeed been completed). The solution was slowly added to a boiling solution of sodium carbonate (200 g in 400 ml water heated to boiling point), the solution was filtered and the resulting precipitate washed until the conductivity of the wash water was less than 500 μs. Potassium waterglass (PWG) (40 g) was added and the mixture was stirred for 30 minutes after which copper(II) acetate (5 g) was added. The mixture was stirred for an additional 2 hours at 40° C. before it was filtered.

Example 10

Catalyst Preparation and the Use Thereof in Ft Synthesis

Figure 5:
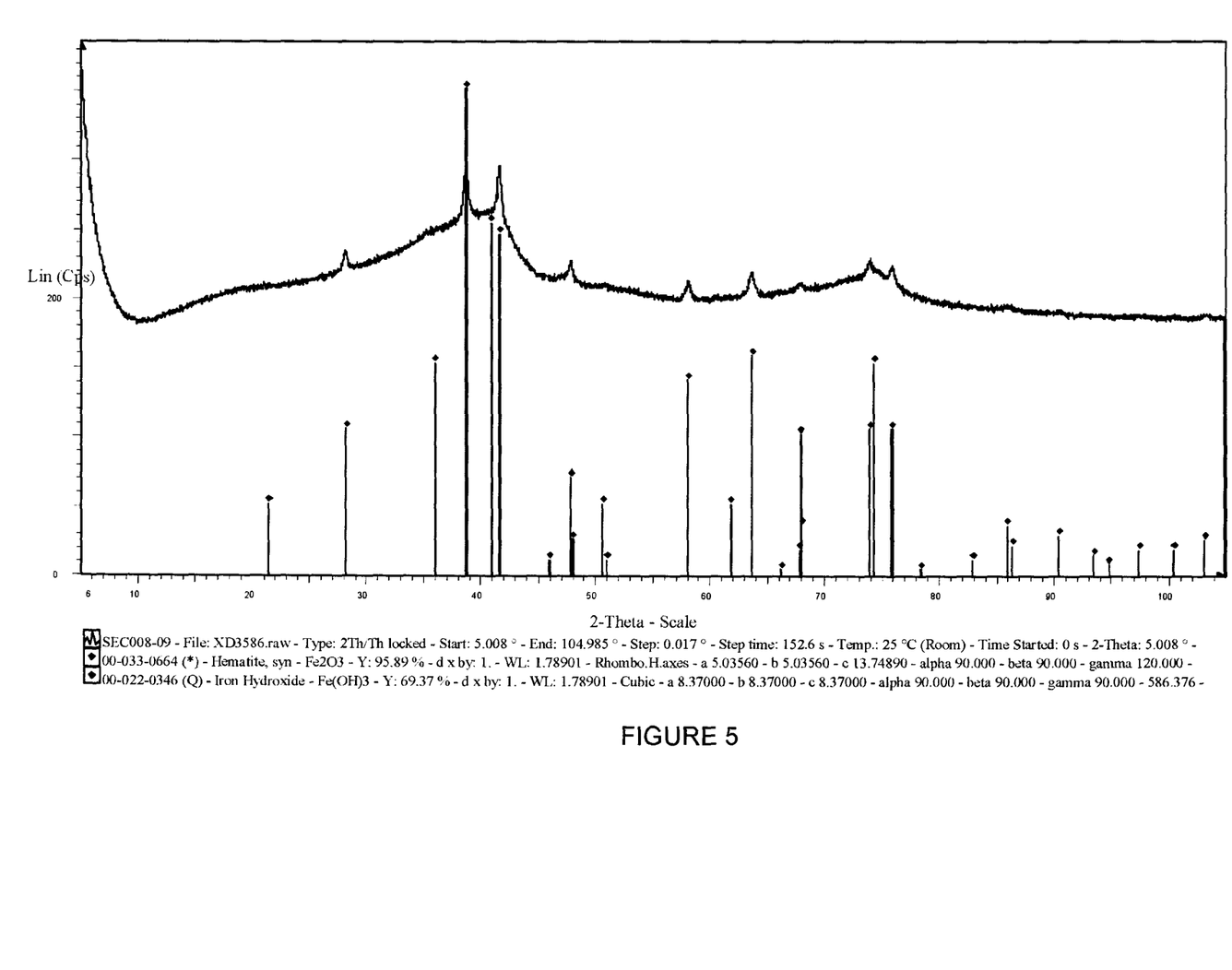
FIG. 5: is an XRD pattern for a chemically promoted iron catalyst precursor prepared in accordance with the invention as set out in Example 9.

The following procedure was followed in forming a chemically promoted iron catalyst:

The precipitate formed in Example 9 was dried at 150° C. and subsequently calcined at 450° C. The XRD graph of the resultant catalyst precursor is shown in FIG. 5, from which it is evident that the resulting iron catalyst precursor is in the Fe(OH)$_3$ phase. In this phase, iron has an oxidation state of Ill. The catalyst precursor was sieved between 36 and 150 μm before it was evaluated under Fischer Tropsch synthesis conditions as follows:

300-350 g of Fischer Tropsch wax was loaded into a 1 l CSTR and melted at 160° C. After the wax was completely melted, 10 g of the catalyst precursor was added. The reactor was closed and the temperature was set at 255° C. and the stirrer switched on. The pressure of the system was increased slowly with Argon until a pressure of 14.5 bar was achieved. After the temperature and pressure stabilised at 255° C., H$_2$ and CO was introduced while the Argon was decreased until a H$_2$/CO ratio of 1.55 and a gas hourly space velocity (GHSV) of 10500 ml$_n$/g cat/h was achieved. The catalyst precursor was activated under these conditions for 16 hours. The catalyst yielded a syngas conversion of 16% (at a GHSV of 8000 ml/g cat/h) and a methane selectivity of 8.0%.

The results obtained are reflected in Table I set out below.

Example 11

Catalyst Precursor Preparation

The following procedure was followed in forming a chemically promoted iron catalyst precursor wherein propionic acid, in place of acetic acid, is employed in the dissolution of iron:

Iron (30 g, 0.5372 mole) was dissolved under a constant flow of nitrogen in a mixture of water (65 ml) and propionic acid (78 ml, 1.048 mole) at 70° C. to form Fe(II) acetate in solution, whereby the iron:propionic acid mole ratio was 1:2. After all the iron was dissolved, the solution was filtered and then cooled to room temperature and 7.75 g of a promoter comprising copper(II) acetate monohydrate (0.03882 mole) and 160 ml of a solution of propionic acid (1.223 mole) and water (1:1 volume ratio) was added such that the final iron:propionic acid mole ratio was 1:4. After this, hydrogen peroxide (30 w/w % in water) (60 ml) was slowly added to the solution to oxidise the Fe(II) propionate to Fe(III) propionate. The solution was stirred for three hours at room temperature. After complete oxidation, the solution turned a deep purple colour (UV-Vis was used to confirm that oxidation thereof was complete) and the solution was added to a boiling solution of sodium carbonate (200 g in 600 ml of water). The solution was filtered and the resulting precipitate washed until the conductivity gave less than 500 μs.

Example 12

Catalyst Preparation and the Use Thereof in Ft Synthesis

Figure 6:
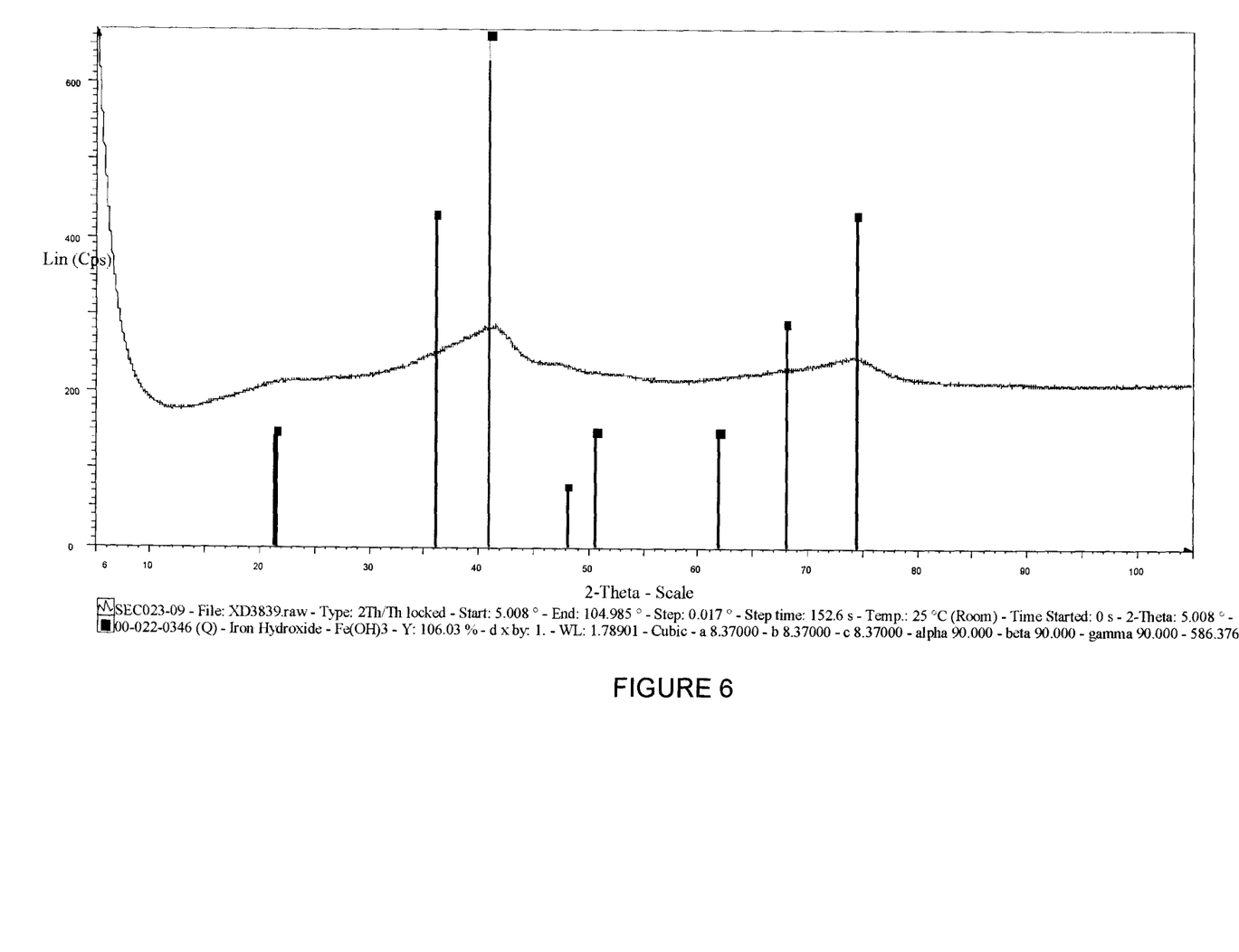
FIG. 6: is an XRD pattern for a chemically promoted iron catalyst precursor prepared in accordance with the invention as set out in Example 11.

The following procedure was followed in forming a chemically promoted iron catalyst:

The precipitate formed in Example 11 was dried at 150° C. and subsequently calcined at 450° C. The XRD graph of the resultant catalyst precursor is shown in FIG. 6, from which it is evident that the resulting iron catalyst precursor is in the Fe(OH)$_3$ phase. In this phase, iron has an oxidation state of Ill. The catalyst precursor was sieved between 36 and 150 μm before it was evaluated under Fischer Tropsch synthesis conditions as follows:

300-350 g of Fischer Tropsch wax was loaded into a it CSTR and melted at 160° C. After the wax was completely melted, 10 g of the catalyst precursor was added. The reactor was closed and the temperature was set at 255° C. and the stirrer switched on. The pressure of the system was increased slowly with Argon until a pressure of 14.5 bar was achieved. After the temperature and pressure stabilised at 255° C., $H_2$ and CO was introduced while the Argon was decreased until a $H_2$/CO ratio of 1.55 and a gas hourly space velocity (GHSV) of 10500 $ml_n$/g cat/h was achieved. The catalyst precursor was activated under these conditions for 16 hours.

The results obtained are reflected in Table I set out below.

Example 13

Comparative Example—Catalyst Precursor Preparation

The following procedure was followed in forming a chemically promoted iron catalyst precursor prepared in accordance with a one-pot system using an acetic acid:iron ratio less than 3:1:

Iron powder (30 g, 0.5372 mole) was added into a round bottom flask (500 ml). Acetic acid (95 ml) and water (95 ml) was added to the iron powder, whereby the iron:acetic acid ratio was 1:3. Hydrogen peroxide (30%) (61 ml) was added slowly through a condenser to the solution for 5 minutes. The solution was left to reflux while stirring at 70° C. for 16 hours and the solution was thereafter added to boiling sodium carbonate (200 g in 600 ml of water). The solution (pH=7.4 and adjusted with acetic acid to 6.2) was filtered and the resulting precipitate washed until the conductivity gave less than 500 μs. Potassium waterglass (30.11 g) was added, stirred for one hour at 60° C. and filtered. Copper acetate (4.5 g) was added to the precipitate, filtered, dried at 145° C. for two hours and then calcined at 400° C. The sample was submitted for XRD and ICP analysis.

Example 14

Comparative Example—Catalyst Preparation and the Use Thereof in FT Synthesis

Figure 7:
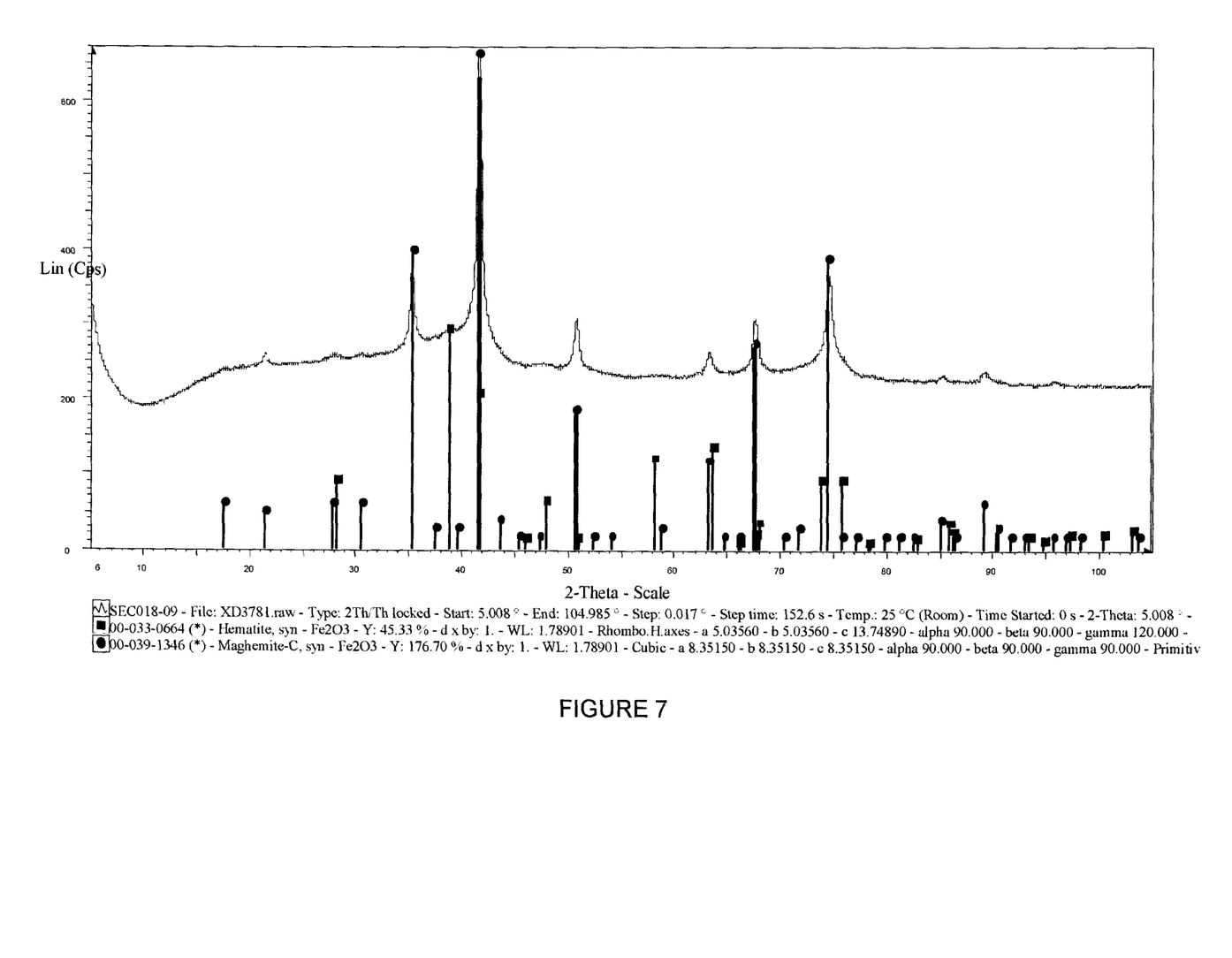
FIG. 7: is an XRD pattern for a chemically promoted iron catalyst precursor prepared in accordance with a one-pot system using an acetic acid:iron ratio less than 3:1 as set out in Example 13.

The following procedure was followed in forming a chemically promoted iron catalyst:

The precipitate formed in Example 13 was dried at 150° C. and subsequently calcined at 450° C. The XRD graph of the resultant catalyst precursor is shown in FIG. 7, from which it is evident that the resulting iron catalyst precursor is a mixture of phases i.e. Hematite and Maghemite. In these phases, iron has an oxidation state of III. The catalyst precursor was sieved between 36 and 150 μm before it was evaluated under Fischer Tropsch synthesis conditions as follows:

300-350 g of Fischer Tropsch wax was loaded into a II CSTR and melted at 160° C. After the wax was completely melted, 10 g of the catalyst precursor was added. The reactor was closed and the temperature was set at 255° C. and the stirrer switched on. The pressure of the system was increased slowly with Argon until a pressure of 14.5 bar was achieved. After the temperature and pressure stabilised at 255° C., $H_2$ and CO was introduced while the Argon was decreased until a $H_2$/CO ratio of 1.55 and a gas hourly space velocity (GHSV) of 10500 $ml_n$/g cat/h was achieved. The catalyst precursor was activated under these conditions for 16 hours. The catalyst yielded a syngas conversion of 5.6% (at a GHSV of 9018 $ml_n$/g cat/h) and a methane selectivity of 9.5%.

The results obtained are reflected in Table I set out below.

Discussion of Results

TABLE 1

Results obtained when the catalysts prepared in accordance with the Examples were evaluated under Fischer Tropsch synthesis conditions

| Example No. | Iron phase of the catalyst precursor | CO + $H_2$ conversion | Methane selectivity (%) | Gas Hour Space Velocity (m/g cat/h) | Comment |
| --- | --- | --- | --- | --- | --- |
| 2 | Fe(OH)$_3$ | 30.0 | 2.0 | 10500 | Hydrogen peroxide oxidation, base precipitation |
| 5 | Hematite | 4.5 | 7.1 | 6385 | Hydrogen peroxide oxidation, thermal decomposition |
| 8 | Hematite and Fe(OH)$_3$ | 21.0 | 5.6 | 9018 | Air oxidation and base precipitation |
| 10 | Fe(OH)$_3$ | 16.0 | 8.0 | 8000 | Air oxidation and copper promotion after impregnation |
| 12 | Fe(OH)$_3$ | 25.0 | 4.0 | 9000 | Propionic acid, air oxidation |
| 14 | Hematite and Maghemite | 5.6 | 9.5 | 9018 | Comparative example one-pot batch process |

From Table I, it can be seen that the catalyst prepared in accordance with Example 2 yielded a very high syngas conversion (30%) with relatively low methane selectivity (2%) compared to the other examples at a fairly high Gas Hour Space velocity (GHSV). In this Example, oxidation of Fe(II) to Fe(III) referred to in step (iii) was achieved by hydrogen peroxide.

The catalyst prepared in accordance with Example 8, afforded good results with a syngas conversion of 21% and a methane selectivity of 5.6%. In this Example, oxidation of Fe(II) to Fe(III) referred to in step (iii) was achieved by air.

Examples 2 and 8 thus demonstrate that the process according to the present invention can be successfully employed for both hydrogen peroxide oxidation as well as for oxidation by air.

The catalyst prepared in accordance with Example 5 showed a fairly low syngas conversion of 4.5% with a fairly high methane selectivity of 7.1%. However, the advantage of the process demonstrated by this Example is the fact that the acetic acid could be recycled, as is, without further work-up steps required. It will be appreciated that the results obtained from this Example were to be expected due to the fact that Hematite yields a catalyst with low syngas conversion and relatively high methane selectivity.

The catalyst of Example 10 was prepared by adding a copper promoter to the iron catalyst precursor just after impregnation with silica and potassium. This catalyst therefore demonstrates less interaction between the copper promoter and the iron.

If one compares the results obtained for the catalyst prepared in accordance with Example 10 and the results obtained for the catalyst prepared in accordance with Example 2, one sees a large difference in the activity and selectivity obtained in respect thereof, even though both catalysts yielded the same iron phase, namely $Fe(OH)_3$.

In particular, the syngas conversion is 16% for the catalyst prepared in accordance with Example 10 wherein the copper promoter was added to the iron catalyst precursor just after impregnation with silica and potassium while for the catalyst prepared in accordance with Example 2, which Examples involves co-precipitation of the copper promoter, the syngas conversion is 30%. Similarly, the methane selectivity is much higher for the catalyst prepared in accordance with Example 10 than for the catalyst prepared in accordance with Example 2 (8% vs. 2%).

In Example 12, acetic acid was replaced with propionic acid. It was observed that the dissolution process with propionic acid was much faster than with acetic acid. The catalyst prepared in accordance with Example 12 also yielded $Fe(OH)_3$ as the iron phase. The syngas conversion compared fairly well with that of acetic acid (25% vs. 30%) and the catalyst gave a methane selectivity of 4% at a GHSV of 9000 $ml_n$/g cat/h.

For the catalyst prepared in accordance with the comparative example (Example 14) it was found that the syngas conversion was only 5.6% and Hematite and Maghemite were formed, thereby affording a very inactive catalyst which yielded a high methane selectivity of 9.5%.

These results clearly indicate that there are distinct advantages associated with the process of the present invention. The process of the present invention is carried out as individual and distinct steps, in the manner set out in the above Examples, such that complete dissolution of Fe(0) in the acidic solution is achieved. Accordingly, there is no Fe(0) present with which the promoter can interfere. In this way, the source of promoter can also be introduced prior to hydrolysis of the Fe(III) carboxylate. In contrast, these results are not achieved by the prior art one-pot process employed in Example 14 wherein the carboxylic acid to iron ratio is less than 3:1.

The invention claimed is:

1. A method for the preparation of a hydrocarbon synthesis catalyst material in the form of a hydrocarbon synthesis catalyst precursor including the steps of:
   i) providing Fe(II) carboxylate In solution;
   (ii) if the molar ratio of carboxyl and carboxylate groups, which groups have either reacted with iron or are free to do so, to Fe(II) in the solution of step (i) is not at least 3:1, adding a source of a carboxyl or a carboxylate group to the solution to ensure that said molar ratio is at least 3:1 prior to the completion of the oxidation of the Fe(II) carboxylate referred to in step (iii) below;
   (iii) treating the Fe(II) carboxylate in solution with an oxidising agent to convert it to Fe(III) carboxylate in solution under conditions which ensure that such oxidation does not take place simultaneously with any dissolution of Fe(0);
   (iv) hydrolysing the Fe(III) carboxylate solution resulting from step (iii) and precipitating one or more Fe(III) hydrolysis products;
   (v) recovering the one or more hydrolysis products of step (iv); and
   (vi) adding a source of promoter, in the form of a soluble salt of a transition metal, and a chemical promoter, in the form of a soluble salt of an alkali metal or an alkaline earth metal, during or subsequent to any of the preceding steps in order to produce a catalyst material in the form of a hydrocarbon synthesis catalyst precursor.

2. The method according to claim 1, wherein the source of a carboxyl group or a carboxylate group is a carboxylic acid.

3. The method according to claim 2, wherein the carboxylic acid is selected from the group consisting of oxalic acid, formic acid, acetic acid, glycolic acid, pyruvic acid, malonic acid and propionic acid.

4. The method according to either one of claims 2 or 3, wherein the addition of carboxylic acid serves to ensure that all the Fe(II) carboxylate in solution is oxidised to Fe(III) carboxylate in step (iii).

5. The method according to claim 1, wherein the oxidising agent in step (iii) is selected from the group consisting of one or more of oxygen, hydrogen peroxide, ozone, an organic peroxide, a hydroperoxide, and a gaseous mixture containing oxygen.

6. The method according to claim 1, wherein the hydrolysis products of step (iv) are formed either by precipitation with a base or by means of thermal hydrolysis.

7. The method according to claim 6, wherein the base is selected from the group consisting of sodium carbonate, sodium hydroxide, potassium carbonate, potassium hydroxide, ammonia and ammonium hydroxide.

8. The method according to claim 6, wherein thermal hydrolysis yields a precipitate in the form of an iron oxide, iron oxy-hydroxides iron hydroxides, or a combination thereof, together with a carboxylic acid effluent.

9. The method according to claim 1, wherein the soluble salt of a transition metal is selected from the group consisting of lead, copper, tin, cobalt, nickel, chromium, vanadium, cadmium, zinc, aluminium, manganese, gold, platinum, silver and a mixture of two or more thereof.

10. The method according to claim 1, wherein the Fe(II) carboxylate in solution provided in step (i) is prepared in a prior step comprising the dissolution of iron, having an oxidation state of zero, in an acidic solution including at least one carboxylic acid.

11. The method according to claim 1, wherein the catalyst precursor is a Fischer Tropsch synthesis catalyst precursor.

12. The method according to claim 1, wherein said method, optionally, includes a step of recovering and recycling effluent, in the form of carboxylic acid, to be used in either of steps (i) and/or (ii).

13. A method for the preparation of a hydrocarbon synthesis catalyst material in the form of a hydrocarbon synthesis catalyst comprising preparing a hydrocarbon synthesis catalyst precursor according to the method of claim 1 and activating said hydrocarbon synthesis catalyst precursor by reducing the said catalyst precursor, thereby producing a catalyst material in the form of a hydrocarbon synthesis catalyst.

14. The method according to claim 13, wherein the catalyst is a Fischer Tropsch synthesis catalyst.

15. A hydrocarbon synthesis process comprising preparing a hydrocarbon synthesis catalyst according to the method of either one of claims 13 or 14 and contacting hydrogen with carbon monoxide at a temperature above 100° C. and at a pressure of at least 10 bar in the presence of the hydrocarbon synthesis catalyst thereby producing hydrocarbons and, optionally, oxygenates of hydrocarbons.

16. The process of claim 15, wherein the hydrocarbon synthesis process is a two-phase Fischer Tropsch hydrocarbon synthesis process.

17. The process of claim 15, wherein the hydrocarbon synthesis process is a three-phase Fischer Tropsch hydrocarbon synthesis process.

* * * * *